United States Patent [19]
Langford

[11] Patent Number: 5,225,762
[45] Date of Patent: Jul. 6, 1993

[54] BATTERY MANAGEMENT SYSTEM

[76] Inventor: George Langford, 26 Florence Street, Hornsby, N.S.W., Australia, 2077

[21] Appl. No.: 692,385

[22] Filed: Apr. 29, 1991

[30] Foreign Application Priority Data

Apr. 30, 1990 [AU] Australia .................. PJ9882

[51] Int. Cl.$^5$ .............................................. H02J 7/10
[52] U.S. Cl. ............................. 320/20; 320/14; 320/39
[58] Field of Search ............... 320/14, 20, 21, 39, 320/40, 5, 37, 38

[56] References Cited

U.S. PATENT DOCUMENTS

| | | | |
|---|---|---|---|
| 3,576,487 | 4/1971 | Chase | 320/39 |
| 3,609,503 | 9/1971 | Burkett | 320/40 X |
| 3,700,997 | 10/1972 | Smith | 320/20 |
| 3,857,087 | 12/1974 | Jones | 320/14 |
| 3,895,282 | 7/1975 | Foster et al. | 320/20 |
| 3,938,019 | 2/1976 | Schmitt et al. | 320/21 |
| 3,944,904 | 3/1976 | Hase | 320/39 X |
| 4,385,269 | 5/1983 | Aspinwall et al. | 320/14 |
| 4,426,612 | 1/1984 | Wicnienski et al. | 320/39 |
| 4,563,628 | 1/1986 | Tietz et al. | 320/20 |
| 4,602,205 | 7/1986 | Matsuhashi et al. | 320/39 X |
| 4,714,868 | 12/1987 | Maruyama et al. | 320/5 |
| 4,745,852 | 5/1988 | Martin | 320/20 |
| 4,829,225 | 5/1989 | Podrazhansky et al. | 320/14 |
| 4,959,604 | 9/1990 | Cuesta | 320/20 |
| 5,019,767 | 5/1991 | Shirai et al. | 320/2 |

*Primary Examiner*—Steven L. Stephan
*Assistant Examiner*—Kristine Peckman
*Attorney, Agent, or Firm*—Darby & Darby

[57] ABSTRACT

A battery charger providing a fast charge while the output voltage of the battery does not exceed a reference voltage. The battery charger providing a self-discharge interval after the output voltage exceeds the predetermined reference voltage.

12 Claims, 7 Drawing Sheets

BATTERY MANAGEMENT SYSTEM

BACKGROUND OF THE INVENTION

This invention relates to battery chargers and, in particular, to chargers offering a fast tapered charge for encapsulated nickel cadmium batteries. However, other types of storage battery may be charged by means of the present invention.

A great deal has been written on the subject of charging nickel cadmium batteries. It is well known, for example, that the peculiarities of these batteries require careful management if the full lifespan of the batteries is to be realized.

Prior art battery chargers have provided either trickle charging at low currents, fast charging using high currents or a combination of both. Trickle charging is usually too slow as it takes typically 12 to 14 hours to charge a fully discharged battery. On the other hand, fast charging includes the risk of damaging the battery or reducing its life due to overheating. Nevertheless, fast charging is often preferred as it possible with care to charge a battery in less than one hour. In fast charging, an appropriate parameter of the battery (e.g., output voltage or battery temperature) is usually monitored to detect when it is fully charged. Chargers combining fast and trickle charging allow automatic battery charging in which the battery is quickly charged and then kept topped up by a trickle charge.

It is an object of the present invention to provide a method and apparatus for charging batteries which overcomes, or least ameliorates, the disadvantages of the prior art.

Accordingly, the invention provides a method of charging batteries including the following steps:

applying to the battery a first current of sufficient amplitude to provide a fast charge while the output voltage of the battery does not exceed a first predetermined reference voltage;

terminating the first current a first predetermined interval after the output voltage exceeds the first predetermined reference voltage;

allowing the battery to self-discharge while the output voltage exceeds the first predetermined reference voltage, defining thereby a self-discharge interval; and repeating the preceding steps while the self-discharge interval is less than a first predetermined multiple of the first predetermined interval.

Preferably, the method of the invention further includes the steps of:

producing a measure of battery temperature; and reducing the first predetermined reference voltage in proportion to an increase in the measure of battery temperature.

Preferably, the method of the invention includes the initial steps of:

applying to the battery, for a predetermined test interval, a test current of sufficient amplitude to provide a fast charge;

comparing the output voltage of the battery with a predetermined acceptance reference voltage;

first control means responsive to the first comparator for inhibiting the first charging means a predetermined interval after the output voltage of the battery exceeds the first predetermined reference voltage, the first control means thereby allowing the battery to self-discharge while the output voltage exceeds the first predetermined reference voltage defining a self-discharge interval;

second control means for inhibiting the first charging means while the self-discharge interval is less than a first predetermined multiple of the first predetermined interval and producing an indication of completion of charging.

Preferably the apparatus of the invention includes temperature sensing means for producing a measure of the battery temperature and means for reducing the first predetermined reference voltage in proportion to an increase in the measure of battery temperature.

Preferably, also, the apparatus includes second charging means for charging the battery for a second predetermined interval with a second current of sufficient amplitude to provide a fast charge;

a second comparator for comparing the output voltage of the battery with a predetermined acceptance reference voltage; and third control means for inhibiting the first and second charging means if the output voltage does not exceed the second predetermined acceptance reference voltage and to provide an indication of rejection of the battery.

The apparatus preferably includes means for applying a load to the battery when the self-discharge interval exceeds a second predetermined multiple of the first predetermined interval, said second predetermined multiple being less than the first predetermined multiple, said load being insufficient to substantially discharge the battery;

signal means for producing a signal indicative of the difference between the output voltage of the battery under the application of said load with the output voltage of the battery under the application of no load; and fourth control means responsive to the difference signal for inhibiting the first charging means if the difference signal exceeds a predetermined amount and to provide an indication of rejection of the battery.

An apparatus according to the invention will preferably include third charging means for charging the battery with a third current of sufficient amplitude to provide a trickle charge.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
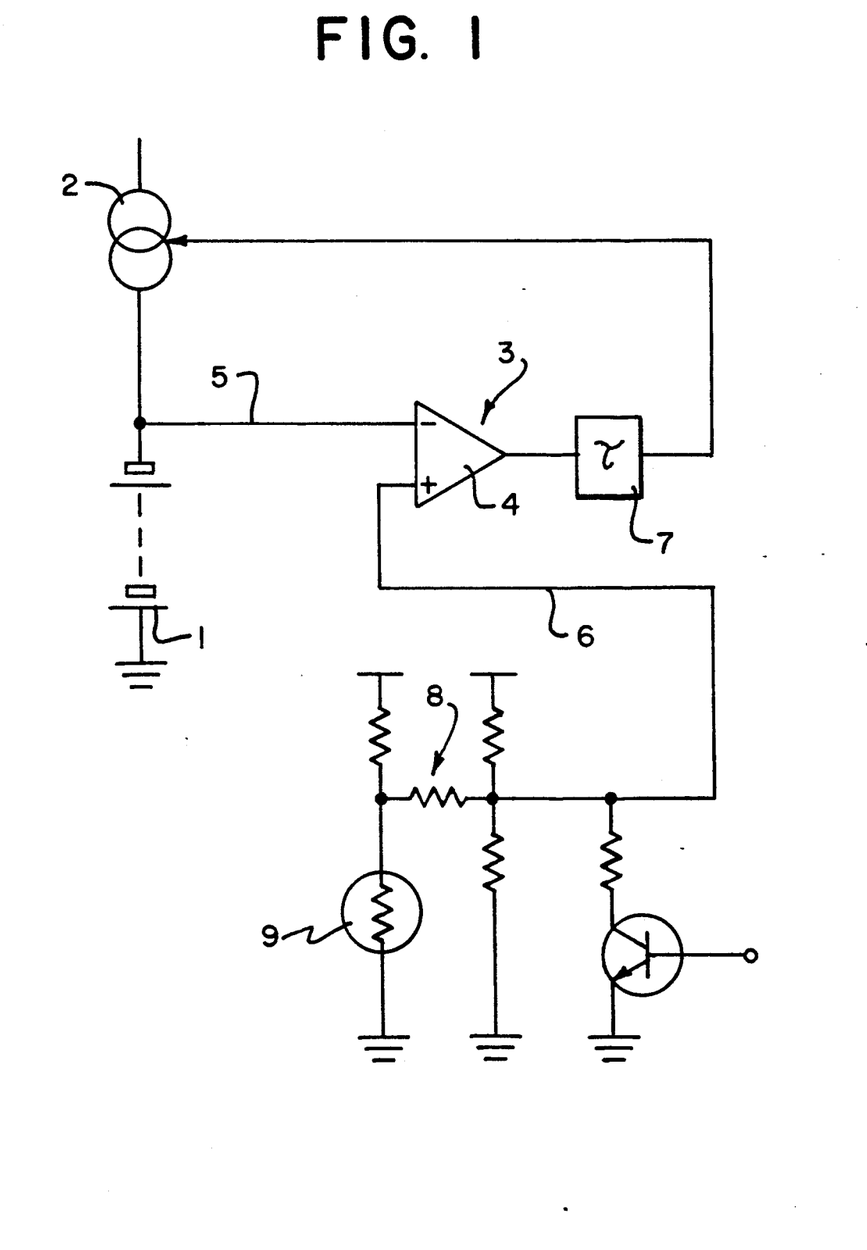
FIG. 1 is a simplified schematic diagram of the battery charger of the present invention.

Referring now to FIG. 1, the invention is shown in simplified schematic form. The battery 1 to be charged is connected to a constant current source 2, and about 3 amp, switched by a feedback circuit 3. The feedback circuit 3 includes a comparator 4 which compares the battery terminal voltage 5 to a battery reference voltage 6, representative of a fully charged battery. If the battery voltage is less than the reference voltage the comparator output is high, setting a retriggerable monostable 7 (of about 35 mS time constant) and turning on the charging current. Provided, therefore, the battery voltage is below the reference voltage, the current remains on. On the other hand, when the comparator output goes low indicating that the battery voltage exceeds the reference voltage the current is turned off after a short delay. The reference voltage is determined by voltage divider 8 which, by virtue of a negative temperature coefficient thermistor 9, generates a reduced voltage if the temperature of the battery rises.

Figure 5:
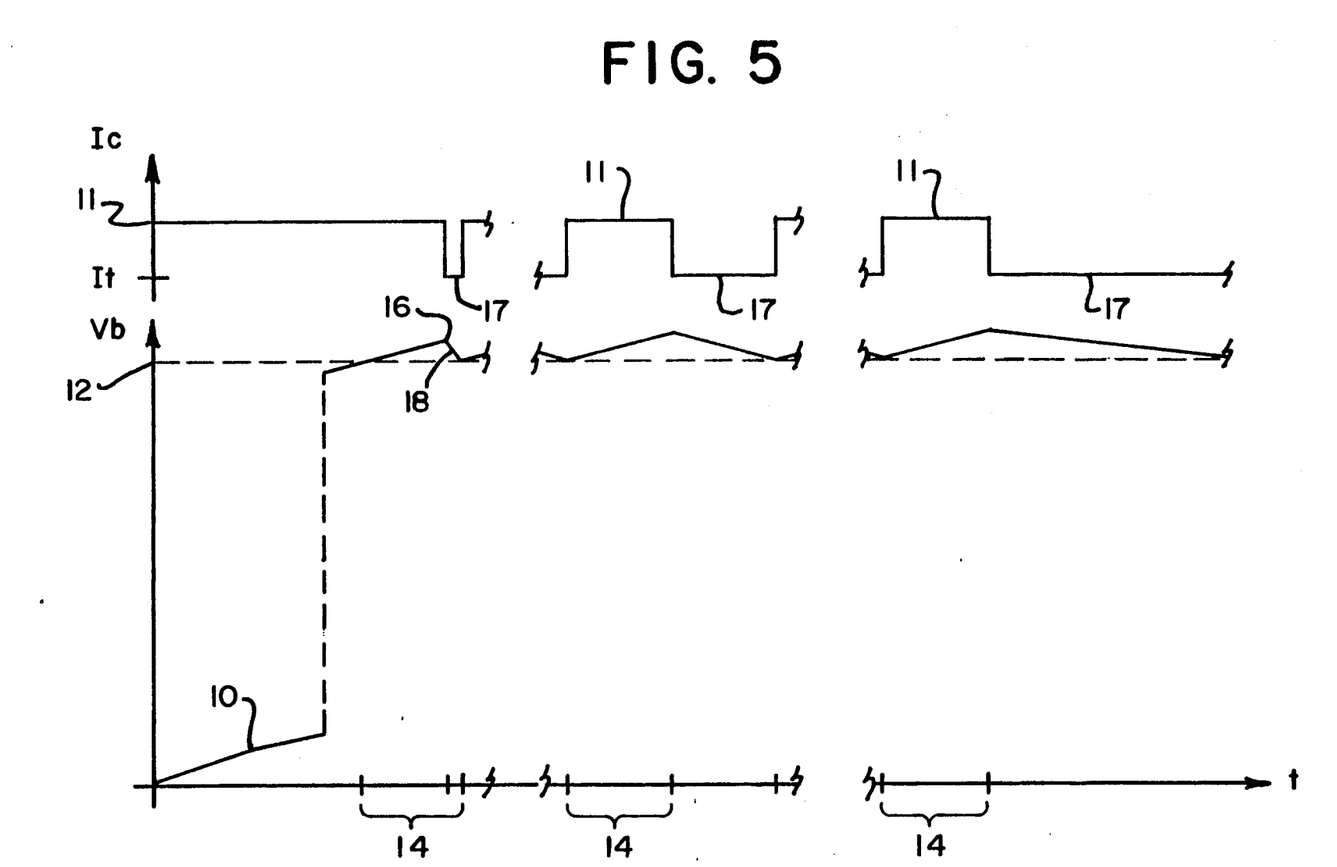
FIG. 5 is a graph of charger current (Ic) and battery voltage (Vb) versus time during a charge cycle.

The battery voltages developed by the charge current in the circuit of FIG. 1 are depicted in FIG. 5. From an initially discharged state 10, the battery terminal voltage rises due to the charge current 11. When the comparator 4 detects that the voltage reaches the reference 12 it switches, but the current is not immediately turned off because of the monostable 7. During the period 14 when the current is on 11, the battery charges to a voltage 16 above the reference, and so when the current is cut off 17 the battery voltage 18 slowly falls to the reference level due to self-discharge. The rate at which the voltage falls depends on the capacity of the battery, its level of charge and its state of health. When the battery voltage reaches the reference the current is switched on again and the battery voltage 19 rises as before so that the cycle is repeated.

It will be appreciated therefore that the charge current has constant amplitude but is pulsed according to the characteristics of the battery. As the battery nears full charge the output voltage falls more slowly during the self-discharge part of the cycle, and so the duty-cycle of the current pulses decreases.

Figure 4:
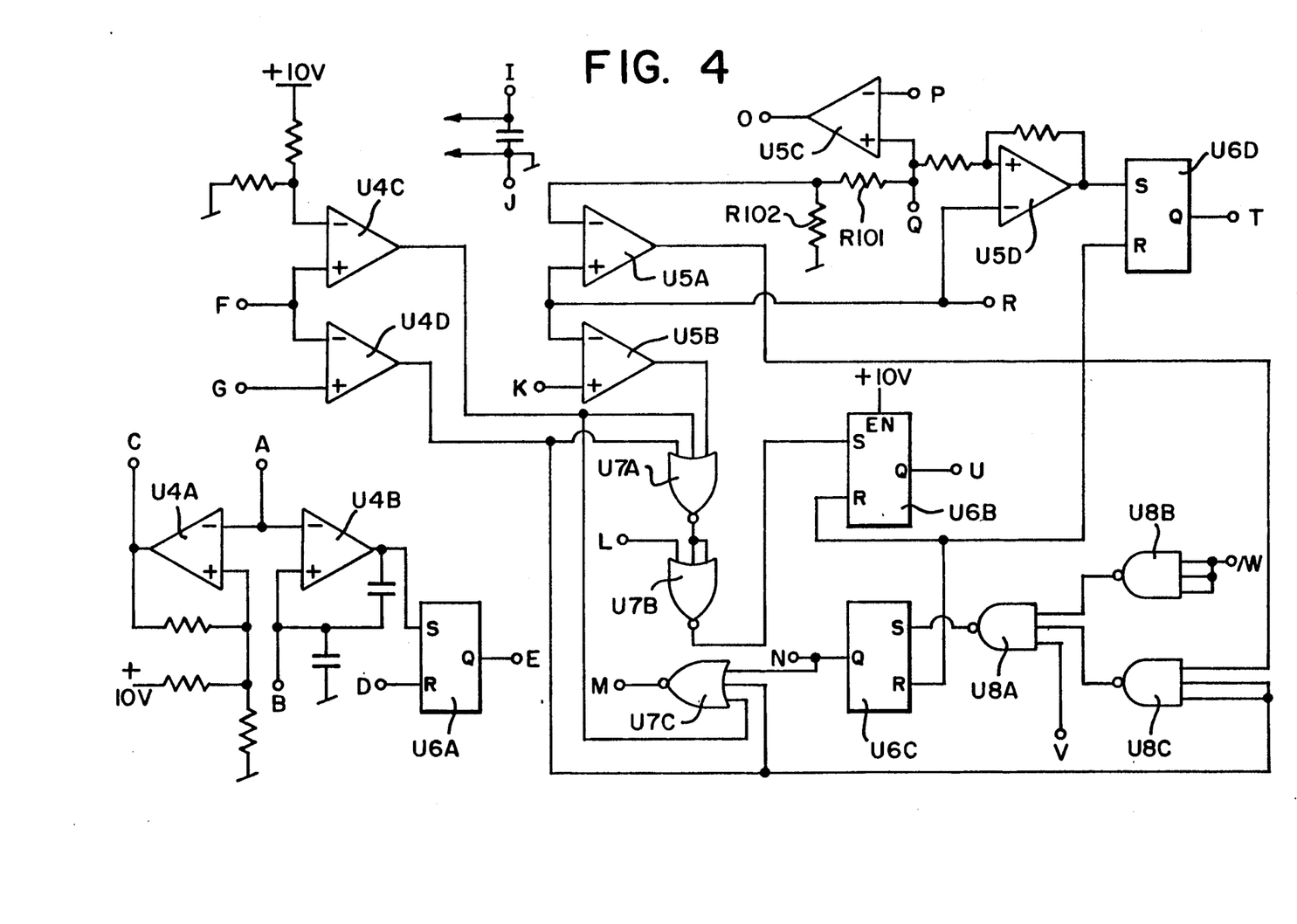
FIG. 4 is a detailed schematic diagram of a third portion of the battery charger of FIG. 1.

Referring now to FIGS. 2a and 2b, 3a and 3b and 4, the circuit of the preferred embodiment is shown in greater detail. FIGS. 2a and 2b 3a and 3b are interconnected along their right and left edges, respectively. FIG. 4 is connected to FIG. 3 by the edge connector shown at the right edges of FIGS. 3a and 3b. The letters A to W on the edge connector connect to corresponding points on FIG. 4.

Figure 2A:
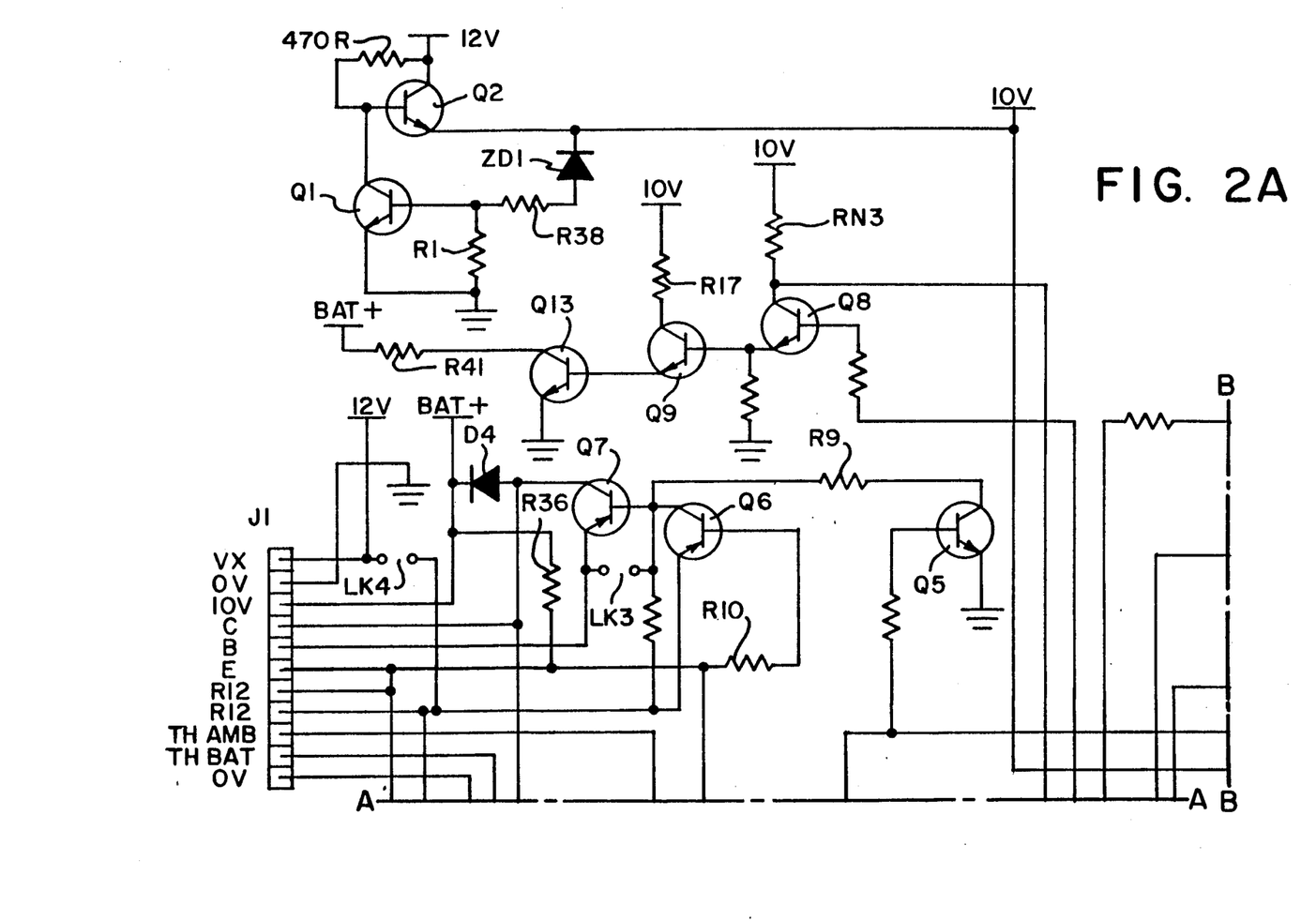
FIGS. 2a and 2b are a detailed schematic diagram of a first portion of the battery charger of FIG. 1.
Figure 2B:
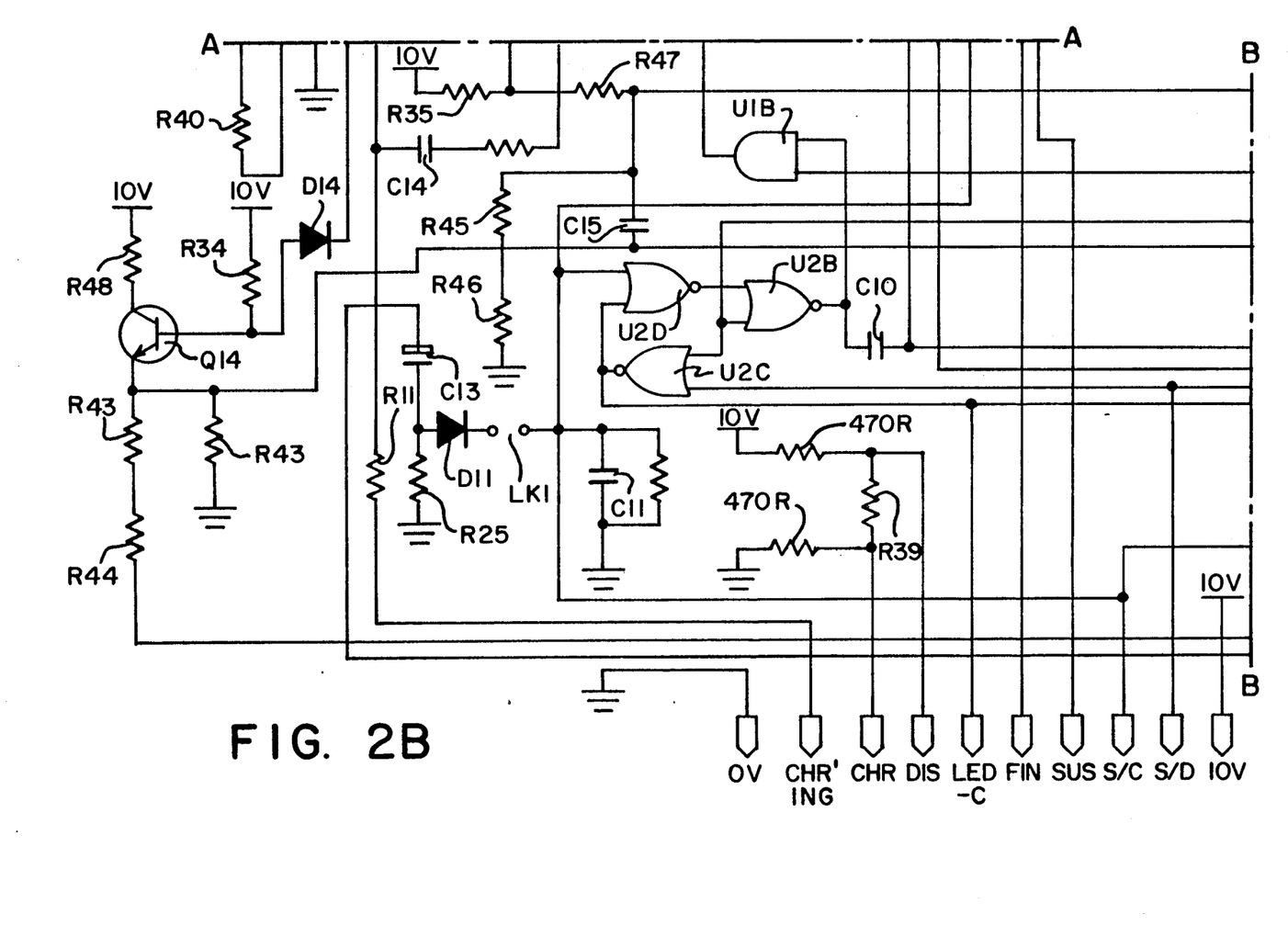
Figure 3A:
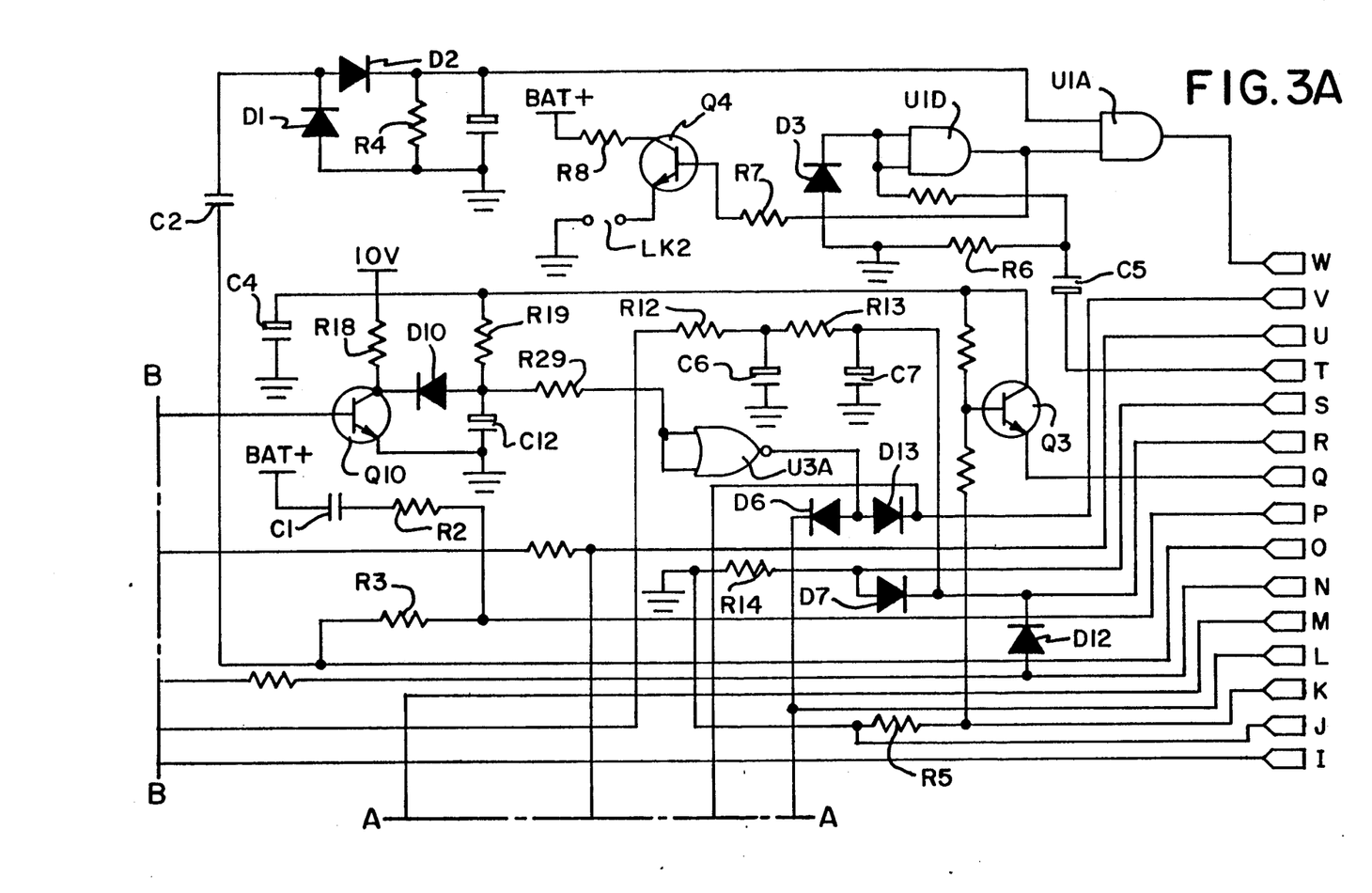
FIGS. 3a and 3b are a detailed diagram of a second portion of the battery charger of FIG. 1.
Figure 3B:
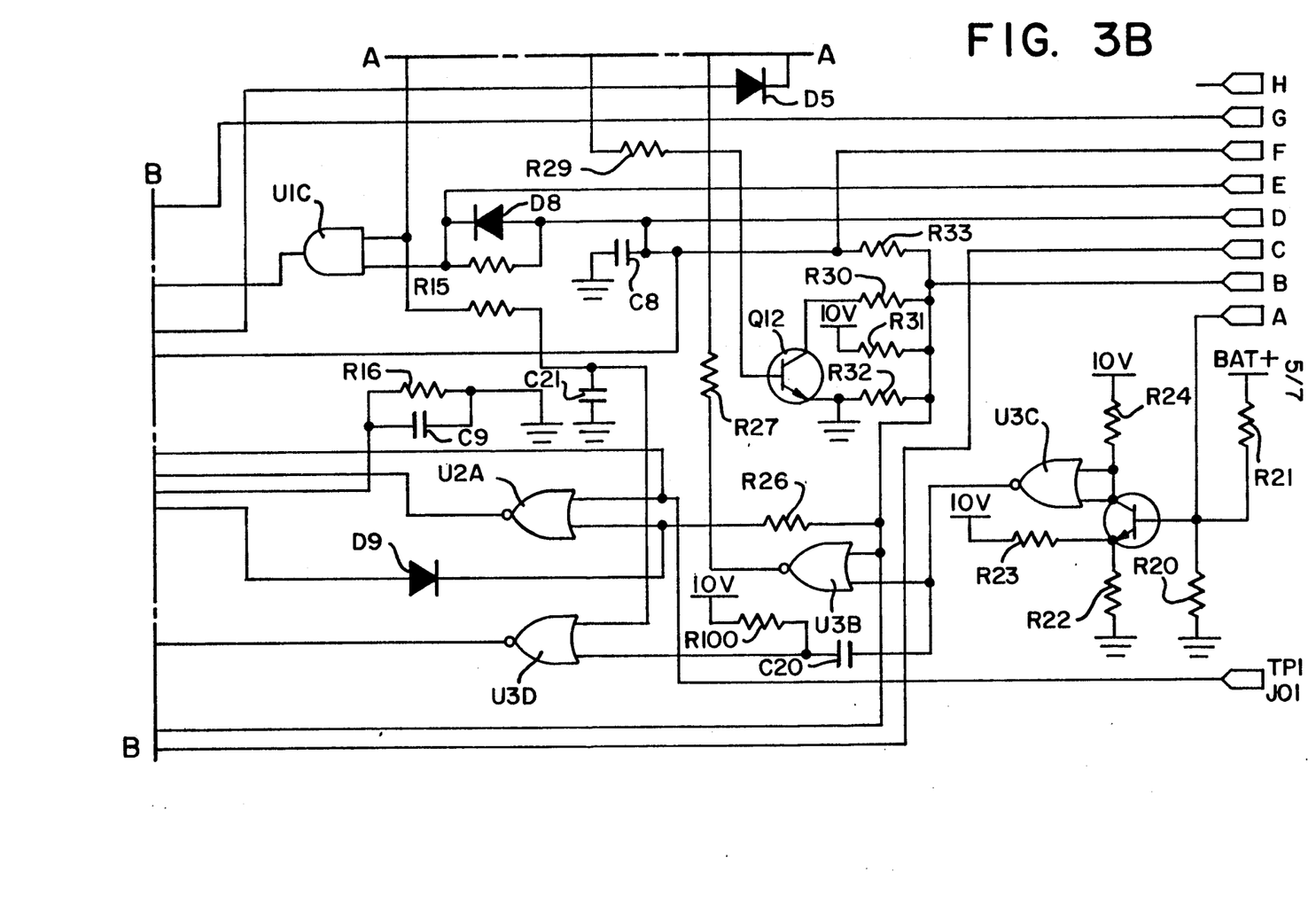

Before a battery is connected the circuit is in a quiescent state. A mode latch consisting of two cross-coupled NOR gates U2C and U2D in FIG. 2 defines either a charging or a discharging mode. The output of the latch enables the pulse circuitry described above to drive the current source switch. The pulse circuitry consists of a comparator U4B, monostable U6A, D8, R15, C8 and gate U1C. When a battery is connected to the charger its presence is detected at the base of a transistor Q11. The resistor values R20, R21 defining the base bias voltage are selected such that a voltage greater than the fully charged voltage of the battery turns on the transistor. Such a voltage is produced by the current source when no load is connected. The transistor and associated gate U3C therefore define an overvoltage signal. Connection of a battery applies a voltage less than the open circuit voltage of the current source. The transistor therefore turns off and the transient at the output of the gate U3C is differentiated by a capacitor C20 and resistor R100 network to produce a "start charge" pulse for triggering the mode latch. In an alternative embodiment, a switch (not shown) is connected to the "start charge" input of the mode latch via edge connector J4 so that charging may be initiated manually.

Whether charging is initiated by a pulse from the switch or the gate at the end of the pulse a transistor Q10 allows a capacitor C12 to charge through a large resistor R19 in order to define an interval in which a "clear" signal is generated by an invertor U3A so that the battery is not rejected before it has had a chance to accumulate a little charge. The resistor and capacitor values are given an approximately 10 second time delay.

At the end of the 10 second delay the clear signal disappears so that logic, shown principally in FIG. 4, is allowed to operate.

Nickel cadmium batteries show a marked rise in output voltage during early charging, approaching in fact the desired fully charged value. In a battery with one or more shorted cells the output voltage is less than optimum and is detected by a comparator U4A with a fixed reference voltage, predetermined according to the battery type for which the charger is intended. The comparator compares a voltage representative of the actual battery terminal voltage with a reference defined by a voltage divider to produce an output indicative of an "undervoltage" condition.

The undervoltage signal is combined with the overvoltage signal in a NOR gate U3B to provide a combination signal which indicates an early anomaly in the battery voltage. This early anomaly is applied to a NAND gate U8A shown in FIG. 4 which sets a "suspect battery" latch U6C, which in turn inhibits the current pulses via a NOR U7C gate and two AND gates U1B, U1C.

If no fault is detected, the charging continues as described above with the "off" portion 17 of the current pulses becoming greater as the battery self-discharges more slowly. Two negative temperature coefficient thermistors are provided to measure temperature. The thermistors are mounted remotely and connected via edge connector J1 at the left of FIG. 2. One TH BAT, in thermal contact with the battery, monitors battery temperature while the other TH AMB monitors ambient temperature. If, at any time, the battery temperature rises significantly above ambient temperature, the output of a comparator U4D inhibits the current pulses via the NOR gate U7C as described for the early anomaly tests and a latch U68 is set to indicate termination of the charging cycle. This is achieved via the NOR gates U7A, U7B in FIG. 4. At the same time, comparator U4C compares the battery temperature to a fixed reference. A battery that is tool cold will prevent charging also via the NOR gates U7A and U7B in the manner of the overtemperature comparator U4D.

As the battery approaches a true fully charged state the duty cycle of the current pulses decreases until 50% is detected. The voltage driving the current switch is integrated by R12, R13, C6 and C7 to provide a measure of duty cycle. A comparator U5D compares this integrated voltage with a reference voltage predetermined to represent a 50% duty cycle. The output of a further latch U6D triggered by the comparator is applied to a differentiator circuit c5 and R6 with a large time constant. The resultant ten second load pulse buffered by a gate U1D drives a transistor Q4 which connects a load resistor R8 across the battery for the duration of the pulse. During the load pulse the voltage on the battery rises and falls as the charge current pulses alternate with periods of discharge through the load. The AC waveform at the battery terminal is amplified by USC, rectified D1 and D2, integrated C3 and applied to an AND gate U1A to test the ability of the battery to tolerate moderate loads. A bad battery is rejected because the integrated terminal voltage is able to trigger the suspect battery latch via the AND gate and a NAND gate U8B.

If the battery is acceptable, the charging circuit continues to provide current pulses of decreasing duty cycle. The voltage representative of 50% duty cycle is further divided by a resistor network R101 and R102 for comparison with the integrated current switching signal to provide a further signal which indicates when the duty cycle is less than 40%. This signal is then combined with a measure of the temperature of the battery in a NAND gate U8C so that a battery which overheats too early in the charging cycle will cause termination of the charge and produce a suspect battery indication as before.

Ultimately the duty cycle of the current pulses into a good battery until it reaches 10%. This is detected by a comparator U5B which drives a latch U6B to provide an indication that fast charging is terminated. The battery continues to be charged, however, by means of a trickle charge current through a resistor across the output transistor of the current switch circuit. This transistor (not shown) is a large PNP power device mounted on a heatsink and connected to the C, B, E terminals of edge connector J1. Similarly, a large resistor R12 is connected to the corresponding terminals of the edge connector. It will be appreciated that, in fact, the trickle charge current flows via the resistor even when the fast charge current is turned off. The "off" level of charge current 17 in FIG. 5 is actually the trickle current.

In a further mode of operation the circuit of the invention can discharge batteries with a modest current of the order of 1 amp. For this purpose the mode latch provides a "start discharge" input for connection to a switch (not shown) via edge connector J4 which momentarily connects the logic input to the supply rail.

For the discharge mode a bistable circuit comprising a NOR gate U2A and transistor Q8 is initially triggered by the mode latch through a capacitor C10. If the undervoltage signal from R26 is not active at the input to the NOR gate, the negative pulse generated by the transition from charging to discharging mode ensures that transistor Q8 is on. If the transistor is already on, a negative pulse has no effect. The bistable circuit switches on another transistor Q13 which provides a discharge path for the battery through a current limiting resistor R41. The resistor value is selected to give about 1 amp.

When the battery is discharged sufficiently that an undervoltage signal arises or the mode latch changes to charging mode, the bistable circuit is toggled to turn off the discharge current. This avoids the "voltage reversal" problem which sometimes arises when series connections of cells are discharged too deeply.

The present invention is designed to be modified according to the characteristics of the batteries to be charged. In particular, the values of reference voltages are adjusted according to the batteries which are to be used with the charger. While the invention was designed primarily for small encapsulated nickel cadmium batteries for use in mobile radios, it will be apparent to those skilled in the art that the present invention may be adapted to charge batteries of various capacities without departing from the spirit of the invention.

It will also be appreciated that the method of charging disclosed here is adaptable to nickel cadmium cells not necessarily designed to withstand fast charging. Any overheating of a battery due to accidental, or other, mismatching of current capacity will only result in early rejection of the battery and not damage.

What is claimed is:

1. A method of charging a battery comprising the steps of:

applying to the battery a first current of sufficient amplitude to provide a fast charge while the output voltage of the battery does not exceed a first predetermined reference voltage;

terminating the first current a first predetermined interval after the output voltage exceeds the first predetermined reference voltage;

allowing the battery to self-discharge while the output voltage exceeds the first predetermined reference voltage, thereby defining a self-discharge interval;

repeating the preceding steps while the self-discharge interval is less than a first predetermined multiple of the first predetermined interval so as to generate first current pulses;

applying a load to the battery when the self-discharge interval exceeds a second predetermined multiple of the first predetermined interval, said second predetermined multiple being less than said first predetermined multiple, said load being insufficient to substantially discharge the battery; and rejecting the battery if the output voltage under said load differs by a predetermined amount from the output voltage under no load.

2. A method as recited in claim 1, further including the steps of:

measuring the battery temperature; and reducing the first predetermined reference voltage in proportion to an increase in the battery temperature.

3. A method as recited in claim 1, further including the initial steps of:

comparing the output voltage of the battery with a predetermined acceptance reference voltage after a predetermined test interval from initial application of said first current; and rejecting the battery if the output voltage does not exceed the predetermined acceptance reference voltage.

4. A method as recited in claim 2, further including the initial steps of:

comparing the output voltage of the battery with a predetermined acceptance reference voltage after a predetermined test interval from initial application of said first current; and rejecting the battery if the output voltage does not exceed the predetermined acceptance reference voltage.

5. A method as recited in claim 1, wherein said first predetermined multiple corresponds to a duty cycle of said first current pulses of about 10 percent.

6. A method as recited in claim 1, wherein said second predetermined multiple corresponds to a duty cycle of said first current pulses of about 50 percent.

7. A method as recited in claim 1, further including the step of:

applying to the battery a current of sufficient amplitude to provide a trickle charge.

8. An apparatus for charging a battery, comprising:

first charging means for charging the battery with a first current of sufficient amplitude to provide a fast charge;

a first comparator for comparing the output voltage of the battery with a first predetermined reference voltage;

first control means responsive to the first comparator for inhibiting the first charging means a first predetermined interval after the output voltage of the battery exceeds the first predetermined reference voltage;

said first control means further responsive to said first comparator for activating said first charging means when said output voltage falls below said predetermined reference voltage, a time between said inhibition and said activation being denoted as a battery self-discharge interval;

second control means for inhibiting the first charging means when said self-discharge interval exceeds a first predetermined multiple of the first predetermined interval and for producing an indication of completion of charging;

means for applying a load to the battery when the self-discharge interval exceeds a second predetermined multiple of the first predetermined interval, said second predetermined multiple being less than the first predetermined multiple, said load being insufficient to substantially discharge the battery; and third control means responsive to the difference between the output voltage of the battery under the application of said load with the output voltage under the application of no load for inhibiting the first charging means if the difference exceeds a predetermined amount and for providing an indication of rejection of the battery.

9. An apparatus as recited in claim 8, further comprising:

a second comparator to compare the output voltage of the battery with a predetermined acceptance reference voltage after a predetermined test interval from said initial application of said first current; and means responsive to said second comparator for inhibiting said first charging means if said output voltage does not exceed said acceptance reference voltage, and for providing an indication of rejection of the battery.

10. An apparatus as recited in claim 8, wherein said first predetermined multiple corresponds to a duty cycle of said first current pulses of about 10 percent.

11. An apparatus as recited in claim 8, wherein said second predetermined multiple corresponds to a duty cycle of said first current pulses of about 50 percent.

12. An apparatus as recited in claim 8, further comprising:

trickle charging means for charging the battery with a current of sufficient amplitude to provide a trickle charge.

* * * * *